United States Patent [19]

Elmy et al.

[11] 4,408,683
[45] Oct. 11, 1983

[54] COMBINED CLUTCH AND BRAKING ARRANGEMENT FOR A TRACTOR

[75] Inventors: Raymond L. Elmy, Franklin; Joe Crabtree, Lewisburg, both of Tenn.

[73] Assignee: The Murray Ohio Manufacturing Co., Brentwood, Tenn.

[21] Appl. No.: 878,448

[22] Filed: Feb. 16, 1978

[51] Int. Cl.³ ............... F16D 13/76; F16D 67/02; G05G 9/08
[52] U.S. Cl. ............... 192/11; 56/11.3; 56/11.6; 74/478; 74/480 R
[58] Field of Search ............... 192/11; 56/11.3, 11.6; 74/481, 478, 480 R

[56] References Cited

U.S. PATENT DOCUMENTS

| | | | |
|---|---|---|---|
| 1,234,344 | 7/1917 | Josephson | 74/481 |
| 1,359,385 | 11/1920 | Johnson | 74/481 |
| 1,873,065 | 8/1932 | Starr | 74/481 X |
| 2,142,732 | 1/1939 | Mehlberth | 74/474 |
| 2,988,185 | 6/1961 | Pond | 192/11 X |
| 3,229,452 | 1/1966 | Hasenbank | 56/11.6 X |
| 3,319,731 | 5/1967 | Kenkel | 192/11 X |
| 3,333,902 | 8/1967 | Liverance et al. | 74/478 X |
| 3,539,040 | 11/1970 | Edwards | 192/11 X |

*Primary Examiner*—Rodney H. Bonck
*Attorney, Agent, or Firm*—Cushman, Darby & Cushman

[57] ABSTRACT

A single pedal is employed to control the clutching and braking of a powered tractor. The mechanism involved also includes a hand-operated handle which may be manipulated independently of the actuation of the pedal to effect braking.

3 Claims, 1 Drawing Figure

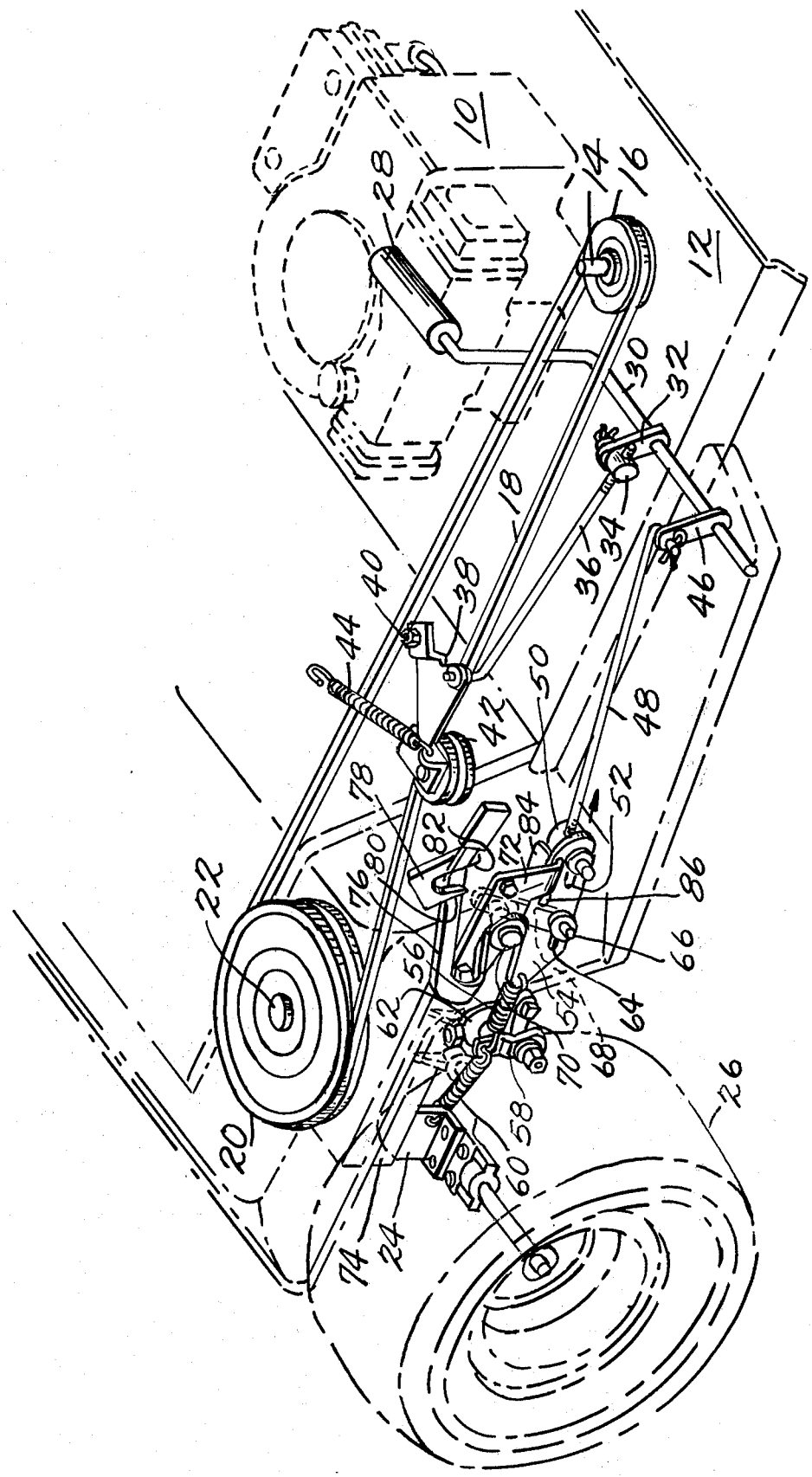

COMBINED CLUTCH AND BRAKING ARRANGEMENT FOR A TRACTOR

BACKGROUND OF THE INVENTION

The present invention is concerned with a clutch and braking arrangement which is particularly suited for use with a lawn or garden tractor.

Conventionally, the clutch and brake functions are controlled by separate pedals. Such an arrangement provides a wide range of control for operating the tractor. However, a certain level of coordination is required to correctly and safely actuate the pedals.

Attempts have been made to simplify matters by combining the clutch and brake functions so that they may be controlled by a single pedal. However, such arrangements typically are complicated, expensive, and difficult to adjust and maintain.

SUMMARY OF THE INVENTION

The present invention employs a single pedal to simultaneously control the clutching and braking of a powered tractor. Upon partial depression of the pedal, the path of power transfer is interrupted. As the pedal is depressed further, a braking mechanism is actuated. The mechanism includes a handle arrangement which can be selectively positioned in order to maintain engagement of the brake even when the pedal is released.

The invention now will be described in greater detail with reference being made to the accompanying drawing which illustrates in perspective the combined clutch and braking arrangement. Related portions of the tractor are shown in phantom lines.

DETAILS OF THE INVENTION

Initially, the power transfer path of the tractor will be disclosed. The tractor includes an engine 10 suitably mounted on a frame 12 and having an output shaft 14 which drives a pulley 16. A drive belt 18 joins pulley 16 to a second pulley 20. The latter pulley is secured to a shaft 22 which is operatively connected to a transaxle 24 for driving the tractor wheels 26 (only one of which is shown).

The transaxle 24 is of conventional construction which is produced by various sources. For example, suitable transaxles are the Models 600 and 800 manufactured by the Peerless Division of Tecumseh Products Co. of Tecumseh, Michigan. The transaxle not only includes mechanisms for driving the wheels 26, but it also includes a disc brake arrangement for stopping wheel rotation.

The relationship of drive belt 18 to pulleys 16 and 20 is such that there normally is slack in the belt which prevents the rotation of pulley 16 from being imparted to pulley 20. However, a clutch is utilized to render belt 16 operative to drive pulley 20.

The clutch arrangement for controlling the condition of the power transfer path includes a pedal 28 and an associated pedal shaft 30 rotatably joined to platform 12 by conventional means (not shown). An arm 32 is secured at one of its ends to shaft 30 so as to rotate therewith in accordance with the depression and release of pedal 28. A connecting element 34 is pivotally joined to the opposite end of the arm 32 and supports one end of a connecting rod 36. The end of rod 36 joined to element 34 is threaded and cooperates with female threads in element 34 in order that the effective length of rod 36 may be adjusted. The opposite end of rod 36 is pivotally secured to a bell crank 38 having one of its ends pivotally joined to the frame 12, as generally indicated by the inclusion of element 40. The free end of bell crank 38 supports a pivotally mounted idler pulley 42 which is normally urged towards drive belt 18 by a spring 44. This occurs because the spring end opposite that joined to the bell crank is supported by means (omitted for convenience of illustration) so located as to tend to rotate the bell crank 38 in a clockwise direction.

When pedal 28 held, as shown, in its normal released position by a conventional spring arrangement (not shown), spring 44 forces pulley 42 against belt 18 to remove any slack therefrom so as to eliminate belt slippage. Consequently, rotation of pulley 16 is transmitted through the belt 18, pulley 20 and transaxle 24 to the tractor wheels 26. However, when pedal 28 is depressed, the bell crank is rotated in a counterclockwise direction, thereby moving idler pulley 42 against the force of spring 44 allowing belt 18 to slacken. Thus, the power transmission path to the wheels 26 is interrupted until such time as pedal 28 is released.

The braking arrangement for the tractor also is controlled by the actuation of pedal 28. More particularly shaft 30 also serves as a support for an additional arm 46 secured to the shaft in the same manner as arm 32. A connecting rod 48 is pivotally connected to the free end of arm 46. The opposite end of rod 48 is joined to a connecting element 50 in a manner identical to that previously described with respect to element 34. Thus, the length of rod 48 also is adjustable. Element 50 is pivotally and slidably received within a slot 52 at one end of a link plate 54. The slot 52 generally extends longitudinally of plate 54. One end of a spring 56 is connected to the end of plate 54 opposite that to which element 50 is joined. The other end of spring 56 is attached to the free end of a brake arm 58 which is pivotally mounted to the transaxle 24. A return spring 60 also is connected between the free end of arm 58 and frame 12. The orientation of spring 60 is such that it urges the arm 58 in a counterclockwise direction about the pivotal axis of the arm. The arm 58 carries a cam arrangement 62 which is operatively associated with the disk brake portion of the transaxle 24.

With the pedal 28 in the released position illustrated in the drawing, spring 60 retains the brake arm 58 in a position whereby cam arrangement 62 is out of operative relationship with the disk brake. However, when pedal 28 is depressed, the resultant movement of connecting rod 48 advances the connecting element 50 within slot 52 until it reaches its forwardmost location within the slot. Further displacement of rod 48 causes link plate 54 to move in the direction shown by the arrowhead. As a consequence, spring 56 operates on brake arm 58 causing it to rotate clockwise about its pivoting axis in opposition to the urging of spring 60. The cam arrangement 62 thereby engages the disk brake structure of transaxle 24 causing the braking of wheels 26.

As can be appreciated from the description just presented, braking does not commence until after the connecting element 50 reaches the forward end of slot 52. In accordance with the preferred embodiment of the invention, slot 52 is dimensioned such that this does not occur until pedal 28 has been depressed considerably. Consequently, in accordance with the described arrangement, the de-clutching operation precedes braking. In other words, operation of the clutching mechanism results from partial depression of the pedal 28, whereas the braking mechanism is not actuated until a greater amount of pedal depression is produced.

The present invention also provides an arrangement whereby the braking mechanism may be locked in its operative position to serve as a parking brake. This is accomplished by additional mechanical linkages associated with link plate 54.

An additional slot 64 is provided in plate 54 intermediate its end and extending substantially parallel to slot 52. The slot 64 receives a post 66 fixed to, and projecting from, one end of an arm 68. A further post 70 is secured to the opposite end of arm 68 and extends through an aperture in a bracket 72 rigidly connected to a housing 74 mounted on frame 12. On the opposite side of bracket 72 from arm 68, one end of a handle 76 is joined to post 70. The opposite end of handle 76 projects through an inverted J-shaped opening 78 provided in housing 74. This configuration of the opening provides slots 80 and 82 bottoming at different elevations on the housing upon which handle 76 can rest for reasons which now will be described.

The normal unengaged position of the parking brake is illustrated in the drawing. In this position, the free end of handle 76 rests at the bottom of slot 82 with the post 66 located proximate the forward end of slot 64 in link plate 54. As the brake pedal 28 is depressed causing plate 54 to move forwardly as previously described, the handle 76 remains unaffected inasmuch as slot 64 is dimensioned such that post 66 is not operatively engaged by the rear end of the slot through full depression of the pedal. However, during pedal depression, the slot 64 does move forwardly with respect to the stationary post 66. With the pedal 28 fully depressed, the operator may move the free end of the handle 76 from slot 82 to slot 80. As this occurs, post 66 moves forwardly with respect to slot 64. Consequently, as the brake pedal 28 is released and link plate 54 moves rearwardly under the force of spring 56, the forward end of slot 64 engages post 66. Further movement of plate 54 rearwardly causes the handle 76 to engage the bottom of slot 80 which is at a higher elevation than the bottom of slot 82. This occurs when plate 54 has only partially returned to its original position depicted in the drawing. Consequently, the handle 76 is firmly locked in position with post 66 still engaging the forward end of slot 64 and the spring 56 overcoming the force of return spring 60 whereby the brake remains activated.

Under these conditions, the force of spring 56 has a tendency to rotate plate 54 in a counterclockwise direction about the axis of post 66. To prevent this, the fixed bracket 72 is provided with a projecting portion 84 which extends through a further elongated slot 86 in plate 54.

When it is desired to release the parking brake, the pedal 28 is fully depressed to move the forward end of slot 64 out of engagement with post 66. This permits handle 76 to be lifted to the uppermost portion of opening 78. Thus, as the pedal is released, the rearward movement of plate 54 and the re-engagement of post 66 by the forward end of slot 64 causes handle 76 to return to the bottom of slot 82 whereby the braking function is terminated.

Obviously, if handle 76 is held in its uppermost position within opening 78, a braking operation occurs even if the operator does not have his foot on pedal 28. This is because plate 54 is retained in its forward position by post 66. Consequently, the mechanism which has been described as a parking brake also can be used as a hand-operated braking device. Such a capability is particularly useful when it is desired to safely begin movement of the tractor from a stopped position on an incline wherein the clutch must first be engaged prior to releasing the brake.

What is claimed is:

1. A combined clutch and braking arrangement for a powered tractor comprising:

a pedal adapted to be depressed and released;

means operatively joined to said pedal and responsive to an initial depression thereof to interrupt a power transfer path arranged to move said tractor, said power transfer path including: an idler pulley operatively connected to said pedal and movable as the pedal is depressed and released, and a drive belt engaged by said idler pulley and retained in operative relationship with a drive pulley when said pedal is released, said drive belt being removed from operative relationship with the drive pulley when the pedal is depressed;

additional means operatively joined to said pedal and responsive to further depression thereof to brake the tractor, said braking means including: a connecting rod operatively joined at one of its ends to said pedal, a link plate provided with a first slot, means received within said slot for joining the other end of said rod to the link plate, said slot being dimensioned such that during the initial depression of the pedal said joining means moves freely within the slot and during the further depression of the pedal said joining means engages an end of the slot to displace the plate, and means connected to said plate and responsive to plate displacement for actuating the brakes of said tractor; and manually operative means to brake the tractor independently of depression and release of said pedal, said manually operative braking means including: handle means operatively connected to said link plate and movable between first and second positions for displacing said plate independently of movement of the connecting rod to operate said brake actuating means, and means received within an additional slot in said link plate for connecting the handle means to said link plate, said slot extending substantially parallel to said first slot and being dimensioned such that when said pedal is released and the handle means is in said first position, the handle connecting means is positioned adjacent an end of the additional slot whereby movement of the handle means towards said second position displaces the link plate, and when said pedal is depressed and the handle means is in said first position, the handle connecting means is located intermediate the ends of said additional slot.

2. An arrangement as set forth in claim 1, wherein said brake actuating means is spring loaded.

3. An arrangement as set forth in claim 1, further comprising:

means for retaining the handle means in said first position out of operative relationship with said link plate; and means for retaining the handle means in said second position to maintain actuation of said brakes independently of the depression and release of said pedal.

* * * * *